W. GAUER.
EYEGLASS RELEASING DEVICE.
APPLICATION FILED JULY 23, 1921.
1,419,369. Patented June 13, 1922.
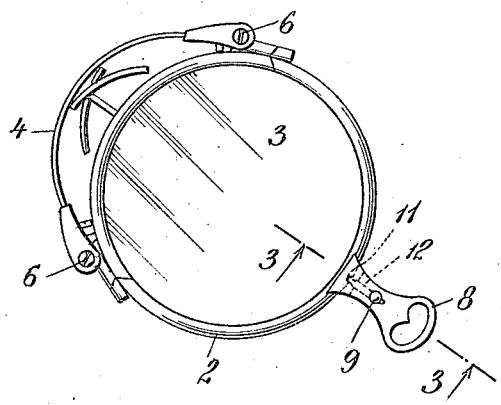
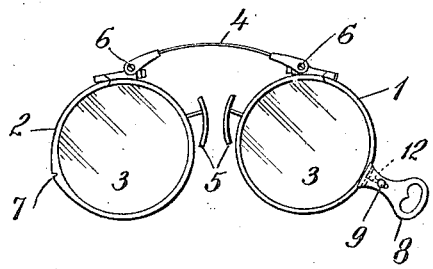
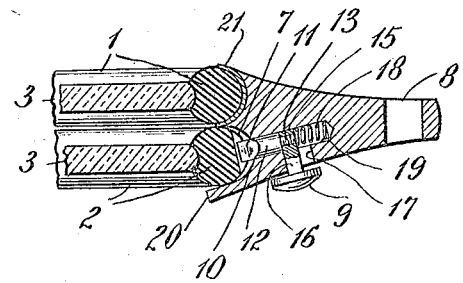
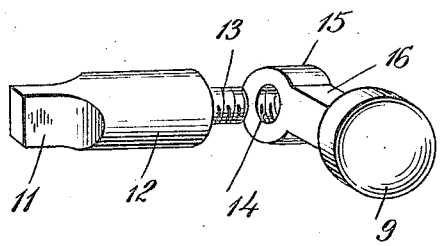
Inventor
William Gauer
By his Attorney
Harry L. Duncan

UNITED STATES PATENT OFFICE.

WILLIAM GAUER, OF NEWARK, NEW JERSEY, ASSIGNOR TO FRANK KREMENTZ COMPANY, OF NEWARK, NEW JERSEY, A CORPORATION OF NEW JERSEY.

EYEGLASS-RELEASING DEVICE.

1,419,369.   Specification of Letters Patent.   Patented June 13, 1922.

Application filed July 23, 1921. Serial No. 487,006.

*To all whom it may concern:*

Be it known that I, WILLIAM GAUER, a citizen of the United States, and resident of Newark, county of Essex, and State of New Jersey, have made a certain new and useful Invention Relating to Eyeglass- Releasing Devices, of which the following is a specification, taken in connection with the accompanying drawing, which forms part of the same.

This invention relates especially to eyeglass releasing devices for Oxford or similar folding eyeglasses of the general type shown in the Krementz Patent No. 1,214,184 of January 30, 1917. The spring catch which may be advantageously mounted in the eyeglass handle may have a cylindrical body and a non-circular or flattened catch end which normally projects into the guide groove, so as to engage the cooperating lens frame and hold the eyeglasses in closed or folded position, and this action tends to prevent angular movement of this catch under operating conditions. The catch has a threaded connection with the catch operating button which may be provided with a threaded socket therefor, in which the threaded end of the catch is tightly screwed so that a permanent and reliable connection is secured between these parts which is not likely to be loosened or disengaged by the ordinary movements of the button when the eyeglass is in use.

In the accompanying drawing showing in a somewhat diagrammatic way an illustrative embodiment of this invention, Fig. 1 is a front view of the eyeglass in folded position.

Fig. 2 is a corresponding view on a somewhat smaller scale showing the eyeglass open.

Fig. 3 is an enlarged sectional view taken along the line 3—3 of Fig. 1; and

Fig. 4 is an enlarged perspective view of the releasing device or catch with its parts in disengaged position.

The folding eyeglass may be of any desired construction such as is shown and described in the Krementz patent referred to, and may comprise the lens frames 1, 2 pivotally connected by the pins or joints 6 with the bridge spring 4, so that the glasses may be folded into the position shown in Fig. 1 in which the lenses 3 are substantially superimposed. A notch such as 7 may be formed in one of the lens frames, so as to be engaged by the end 11 of the spring catch which may be mounted in the handle 8 in which the other lens frame may be secured as by the solder 21.

This spring catch preferably has the non-circular or flattened end 11 adapted to project into the groove 10 in the handle under the influence of the spiral spring 18. This spiral spring may be arranged in the end of the recess 19 in which the catch body 12 may be movably or slidingly arranged, while the connected stem 16 of the operating button 9 may extend out through the slot 17 in the handle. As is shown in greater detail in Fig. 4 the operating button 9 may be formed integral with or securely or permanently attached to the stem 16, which may have the enlargement 15 provided with the threaded socket 14. The threaded end 13 of the spring catch is adapted to screw into this threaded socket and preferably fits sufficiently tightly therein, so as to prevent or minimize accidental disengagement while the secureness of this connection is also promoted by the flat shoulder formed on the catch body adjacent this screw end. The flattened catch end also assists in preventing angular movement of the catch body, since the slot 7 in the lens frame tends to align this catch end when it engages it, so that there is little or no tendency for the catch to become unscrewed during use and a very desirable and reliable connection is thus formed.

This invention has been described in connection with a number of illustrative proportions, parts, materials and arrangements, to the details of which disclosure the invention is not of course to be limited, since what is claimed as new and what is desired to be secured by Letters Patent is set forth in the appended claims.

1. In releasing devices for eyeglasses of the folding Oxford or generally similar type, a spring catch having a cylindrical body adapted to reciprocate in the recess in the eyeglass handle and having a flat non-circular exposed catch end to engage the lens frame and having its other end threaded, and a catch operating button adapted to project from the handle and having a permanently connected stem and threaded socket in which the threaded end of the spring catch is removably and securely fastened.

2. In releasing devices for eyeglasses of the folding Oxford or generally similar type, a spring catch having a body adapted to reciprocate in the recess in the eyeglass handle and having a non-circular exposed catch end to engage the lens frame and having its other end threaded, and a catch operating button adapted to project from the handle and having a connected stem and threaded socket in which the threaded end of the spring catch is removably and securely fastened.

3. In releasing devices for eyeglasses of the folding Oxford or generally similar type, a a catch having a body adapted to move in a recess in the eyeglass and having a non-circular exposed catch and adapted to engage the lens frame and be kept in angular alignment thereby and having its other end threaded, and a catch operating member adapted to project from the handle and having a rigidly connected threaded socket in which the threaded end of the spring catch is screwed.

WILLIAM GAUER.